(12) United States Patent
Krimmer

(10) Patent No.: US 6,965,846 B2
(45) Date of Patent: Nov. 15, 2005

(54) GENERATING A 2D VIEW OF A 3D MODEL

(75) Inventor: Tobias Krimmer, Amberg (DE)

(73) Assignee: Autodesk, Inc., San Rafael, CA (US)

( * ) Notice: Subject to any disclaimer, the term of this patent is extended or adjusted under 35 U.S.C. 154(b) by 862 days.

(21) Appl. No.: 09/885,591

(22) Filed: Jun. 19, 2001

(65) Prior Publication Data

US 2001/0055014 A1 Dec. 27, 2001

(30) Foreign Application Priority Data

Jun. 26, 2000 (DE) .......................................... 100 31 042

(51) Int. Cl.$^7$ ............................................. G06F 17/10
(52) U.S. Cl. ............................ 703/2; 345/427; 345/619
(58) Field of Search .............................. 703/2; 345/419, 345/420, 427, 619, 672

(56) References Cited

U.S. PATENT DOCUMENTS

| | | | | |
|---|---|---|---|---|
| 5,692,115 A | * | 11/1997 | Itoh et al. .................... | 345/427 |
| 5,701,403 A | * | 12/1997 | Watanabe et al. ........... | 345/419 |
| 6,532,021 B1 | * | 3/2003 | Tognazzini et al. ......... | 345/629 |
| 6,549,200 B1 | * | 4/2003 | Mortlock et al. ........... | 345/419 |
| 6,603,486 B1 | * | 8/2003 | Baran et al. ................. | 345/672 |
| 6,654,027 B1 | * | 11/2003 | Hernandez ................... | 345/619 |

OTHER PUBLICATIONS

"CAD für den Maschinenbau: Mit den BCT–Assistenten auf dem richtigen Weg" in the journal "CAD–CAM Report," No. 9, 1998, pp. 30–36.

* cited by examiner

Primary Examiner—Albert W. Paladini
(74) Attorney, Agent, or Firm—Gates & Cooper LLP

(57) ABSTRACT

A method for generating a 2D view (40) of a 3D model (30), the 3D model (30) comprising at least one object (32), wherein a test is made whether or not a predefined 2D representation (52) of the object (32) is available for the 2D view (10, 40), and, if the 2D representation (52) is available, this 2D representation (52) is used in the 2D view (40), and if the 2D representation (52) is not available, a 2D projection (42) of the object (32) is calculated and used in the 2D view (10, 40). A computer program product and an apparatus comprise corresponding features. The invention increases the degree of automation when generating a high-quality 2D view of a 3D model by reducing the amount of manual finishing operations that have hitherto been necessary.

23 Claims, 3 Drawing Sheets

GENERATING A 2D VIEW OF A 3D MODEL

FIELD OF THE INVENTION

The invention generally concerns the technical field of computer aided design (CAD). More particularly, the invention concerns the automatic generation of two-dimensional views (2D views) of a three-dimensional model (3D model) by means of a CAD program.

BACKGROUND OF THE INVENTION

CAD programs are used today in connection with a plurality of tasks in the fields of construction, design and development. Present-day CAD programs provide, besides the original functionality of technical drawing, tools for the whole development process and sometimes also for further fields like, for example, manufacturing and quality control. The term "CAD program" in the sense used herein is therefore to be understood in its broadest meaning as any computer program that comprises a drawing and/or design module and possibly further modules. A widely used CAD program is manufactured and sold by the assignee under the trademark "AutoCAD".

It is general practice when using such a CAD program in the design process to create a 3D model of the intended apparatus or the intended assembly. This 3D model may be viewed from all perspectives in a high, sometimes even photo-realistic quality. However, production plans that represent exact 2D views of the 3D model are required, at the latest, in the preparation steps of the production process. In particular, the usual normal projections (front view, side views, top view, bottom view, rear view) as well as further views are required. The term "view" in this context comprises both sectional and non-sectional views.

It is known to calculate such 2D views from the 3D model by mathematical projection methods. These methods substantially correspond to methods that are already implemented in most CAD programs since they are also used for generating a view of the 3D model that is displayed on the computer monitor.

Such a calculated 2D projection, however, is usually less than optimal. This is because there are, in particular for often-used standard parts or standard features of a part, conventions for the "correct" two-dimensional representation that deviate from the mathematically calculated projection. Such a deviation may possibly be acceptable for the mere visualization of a 3D model. However, a representation conforming to the applicable standards is necessary for an exact 2D view that is to be used, for example, as a production plan.

Figure 1A:
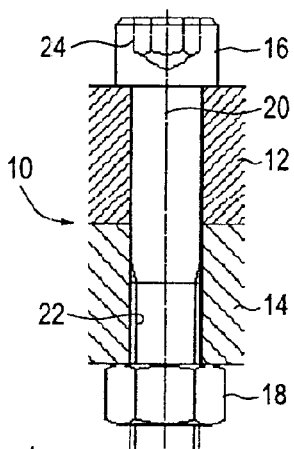
Figure 1B:
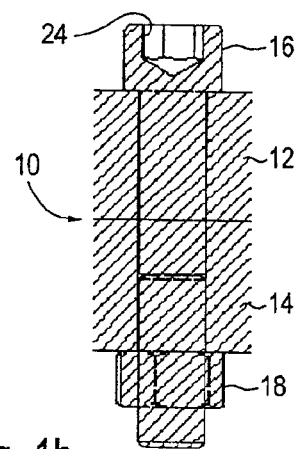

An example for the facts mentioned just above is shown in FIG. 1a and FIG. 1b. FIG. 1a represents, as a 2D view 10, the standard-conforming sectional view of a screw connection of two parts 12, 14 by means of a screw 16 and a nut 18. The middle axis of the screw 16 is located in the sectioning plane. It is shown in FIG. 1b, as an example, how a 2D view 10 of the same assembly is calculated as a 2D projection by known CAD programs.

Although the representation of FIG. 1b is correct from a mathematical point of view, there are several undesirable deviations with respect to the standard-conforming view of FIG. 1a. First, the whole screw connection in FIG. 1b is marked as sectioned by a hatching. It would instead be the usual way to show the whole screw connection in a non-sectioned front view in spite of the sectioned representation of the parts 12 and 14. The second deviation is that in FIG. 1b neither the axis line 20 nor the thread lines 22 denoting the depth of the thread are shown. The third deviation is that FIG. 1b shows the hexagon socket 24 and the hexagon nut 18 in an unusual way. It would be the usual and thus preferable representation to show, as depicted in FIG. 1a, the nut 18 in a front view that is symmetrical with respect to the center axis. The same is true for the hexagon socket 24, for which furthermore dashed lines should be used in order to designate that the hexagon socket 24 is located inside the head cap of the screw 16.

The deviations of the calculated 2D projection from the standard-conforming (or at least common) representation, which have been exemplified here, require a substantial amount of finishing operations. So, for example, the axis line 20 and the thread lines 22 must be inserted by manual drawing operations. The user has to turn the screw connection in the 3D model in an appropriate way in order to obtain a symmetric arrangement of the nut 18 and the hexagon socket 24. Furthermore, several finishing steps are necessary with respect to the sectional hatchings. These operations require much effort and are error-prone. They divert the attention of the user from the actual design tasks towards subordinate, formal aspects and thus diminish the benefits of CAD program.

The article "CAD für den Maschinenbau: Mit den BCT-Assistenten auf dem richtigen Weg" in the journal "CAD-CAM Report", No. 9, 1998, pages 30–36 discloses a CAD program in which parts with integrated assembly logic, e.g., for screw connections, may be stored and managed in a 3D pool. Logical links may be implemented for generating drawings such that, e.g., ball bearings will be shown automatically in a correct way, whereas screws will be shown in a non-sectioned way. Similar automatic methods may be used to suppress or cut out certain features in a 2D sectional representation.

OBJECTS AND SUMMARY OF THE INVENTION

It is therefore an object of the invention to avoid the above-mentioned problems at least partially and thus to increase the degree of automation when generating a high-quality 2D view of a 3D model. A further object of the invention is to reduce the amount of necessary manual finishing operations of 2D views that have been generated automatically. Yet a further object of the invention is to improve the usefulness of CAD programs especially with respect to the automatic generation of production plans or similar 2D views.

According to the invention, one, several or all of the above objects are solved by a method having the features of claim 1, a computer program product having the features of claim 10 and an apparatus having the features of claim 16. The dependent claims concern preferred further embodiments of the invention.

The invention is based on the idea to associate at least one object of a 3D model with at least one predefined 2D representation. The predefined 2D representation is the desired representation of this object for a particular 2D view. When generating this 2D view, the predefined 2D representation is used instead of a mathematically calculated 2D projection of the object. This 2D representation may, for example, be a symbolic representation of the object conforming to the usual practice and standards applicable for engineering drawings, but diverging from the calculated 2D projection of the object.

The invention makes it possible to obtain exact and standard-conforming 2D views. In the terminology used herein, an "object" shall generally be considered as any component of the 3D model like, for example, a part or a portion or component or feature of a part or a group of parts. An "object" in the sense used herein may, in an implementation of the method of the present invention, correspond to an object in the sense of object-oriented programming; however, other implementations are intended as well, wherein these other implementations either comprise a different internal object structure or entirely avoid the concept of objects from a programming point of view.

In the present document, the term "2D projection" is understood to comprise any two-dimensional representation of an object that is calculated by an essentially mathematical method. This method may also comprise, besides projection operations in a more narrow sense, sectional operations. Therefore, in the present text, a calculation of a 2D sectional representation of an object will also be termed as a "2D projection".

The 2D representations provided for an object are, in principle, not subject to any limitation. While these representations will be symbolic representations of the object in many applications, they need not necessarily be standard-conforming representations. The predefined 2D representations may rather have been drawn up according to different criteria and may, for example, conform to internal conventions or to conventions of a supplier of parts, or they may comprise more or less or different pieces of information than the object of the 3D model.

In this connection it is a surprising advantage of the invention that common and repeatedly used parts may, in many applications, be present in the 3D model as considerably simplified objects. This measure reduces the computing and memory requirements for processing the 3D model, and it increases the clarity of the 3D model because the user can concentrate on the less common and less usual parts and is not distracted because of the multitude of details of the standard parts. Such 3D models with simplified standard parts can be used without problems, thanks to the technique of the present invention, because the simplified objects may comprise detailed predefined 2D representations for the various required 2D views.

In practice the predefined 2D representations will mainly be available for often-used objects. In particular, these objects may be standard parts (screws, nuts, retaining rings, and so on) or standard features (undercuts, bearings, and so on). Such objects are often drawn up and offered by the manufacturers of the parts or by third party suppliers. It is then possible, when designing a device, to select suitable objects from an object library, and to insert these objects in the 3D model. The additional effort for providing suitable 2D representations of the objects can be tolerated since these objects need to be defined only once by the manufacturer of the parts, and then can be used again and again.

In preferred embodiments of the invention, the kind of the 2D view to be generated is taken into account when testing whether or not a 2D representation of the object is present. In this connection, the term "kind of the 2D view" is considered to comprise each classification of the view to be generated, wherein this classification may, in particular, be made according to one or several of the following criteria:

direction of view of the 2D view (e.g., front view, top view, side view, rear view, bottom view or other direction of view), sectioned or non-sectioned view, variants in the representation of objects, said variants having been selected by the user or having been proposed according to predefined rules (e.g., different variants for representing a screw connection, as shown in FIG. 4a to FIG. 4d), desired level of detail (e.g., "normal", "simplified", "detailed"), view of only a single object or of the object as part of a larger 3D model, and scale of the 2D view.

Further ways of classifying the kind of the 2D view are possible and are implemented in alternative embodiments; in particular, this may comprise classifications that depend on other objects of the 3D model.

Preferably several predefined 2D representations for several different kinds of the 2D view to be generated are associated with at least some objects. The number of kinds of views for which a suitable 2D representation is available typically depends on the frequency of use of an object. However, because of the multitude of possible kinds of views, it cannot be expected that a suitable predefined 2D representation is associated with an object for each imaginable 2D view. This, however, is not a problem since a 2D projection of the object may be calculated in any case even for unusual 2D views.

In preferred embodiments, the available 2D views of the objects are taken into account when determining hidden lines. In this connection, preferably two cases are possible, namely the first case that the predefined 2D representation hides lines of other objects, and the second case that other objects hide lines of the predefined 2D representation. As a rule, information items about the spatial arrangement of the various objects of the 3D model are used for calculating the hidden lines, and it is preferred to use further information items about the kind of the object and/or the kind of the 2D view. Thus, for example, different line hiding situations are possible when representing a screw connection, depending on the kind of the representation.

It is preferred to obtain the functionality mentioned above of suppressing hidden lines also in connection with inserted 2D representations by considering each inserted 2D representation as a flat object. Using this technique, the mechanisms for suppressing hidden lines that are already provided in the CAD program can be re-used for representing sectional drawings. A special treatment of 2D drawings, which would require much effort, is not needed in these preferred embodiments.

When inserting a flat object, its position is preferably determined depending on one or several criteria. Examples for such criteria are, in particular, the kind of the object, the kind of the 2D view, and the presence or absence of other objects in the 3D model. In this connection, the term "position" as used herein comprises one or several of the following aspects:

position of the 2D representation in the viewing plane of the 2D view (e.g., positioning of a screw in a side view such that the center axis of the screw coincides with the center axis of the corresponding object of the 3D model), position of the flat object perpendicular to the representation plane of the 2D view (in order to achieve the desired result when suppressing hidden lines), and position of the flat object with respect to a rotation around an axis perpendicular to the representation plane or around other axes.

Embodiments of the invention are especially preferred in which, for representing an assembly, first a calculation of hidden lines with respect to the 2D representations of the elements of the assembly takes place in order to produce a flat object that contains a representation of the complete assembly, and then the flat object in turn is used when calculating hidden lines with respect to other objects.

A suitably rotated or slanted representation of the predefined 2D representation may, in particular, be obtained by an affine transformation of the predefined 2D representation. In various alternative embodiments either only rotations or also more complex affine transformations may be used.

The enumeration sequence of the method steps in the claims is not to be construed as a restriction of the scope of protection. Rather, the steps of the method of the present invention may also be performed in another order or in a parallel or quasi-parallel (interleaved) fashion.

In preferred embodiments of the computer program product of the present invention and the apparatus of the present invention, respectively, the computer program product and the apparatus are further developed according to features that correspond to the features that are described above and/or contained in the dependent method claims.

DETAILED DESCRIPTION OF SAMPLE EMBODIMENTS

Figure 2:
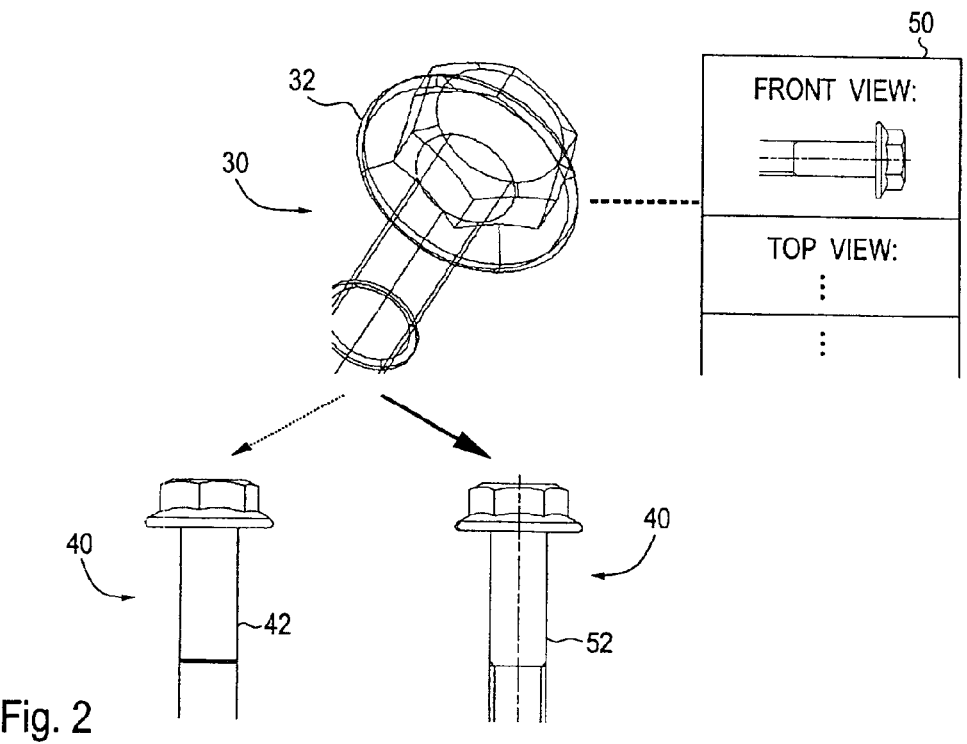
Figure 3:
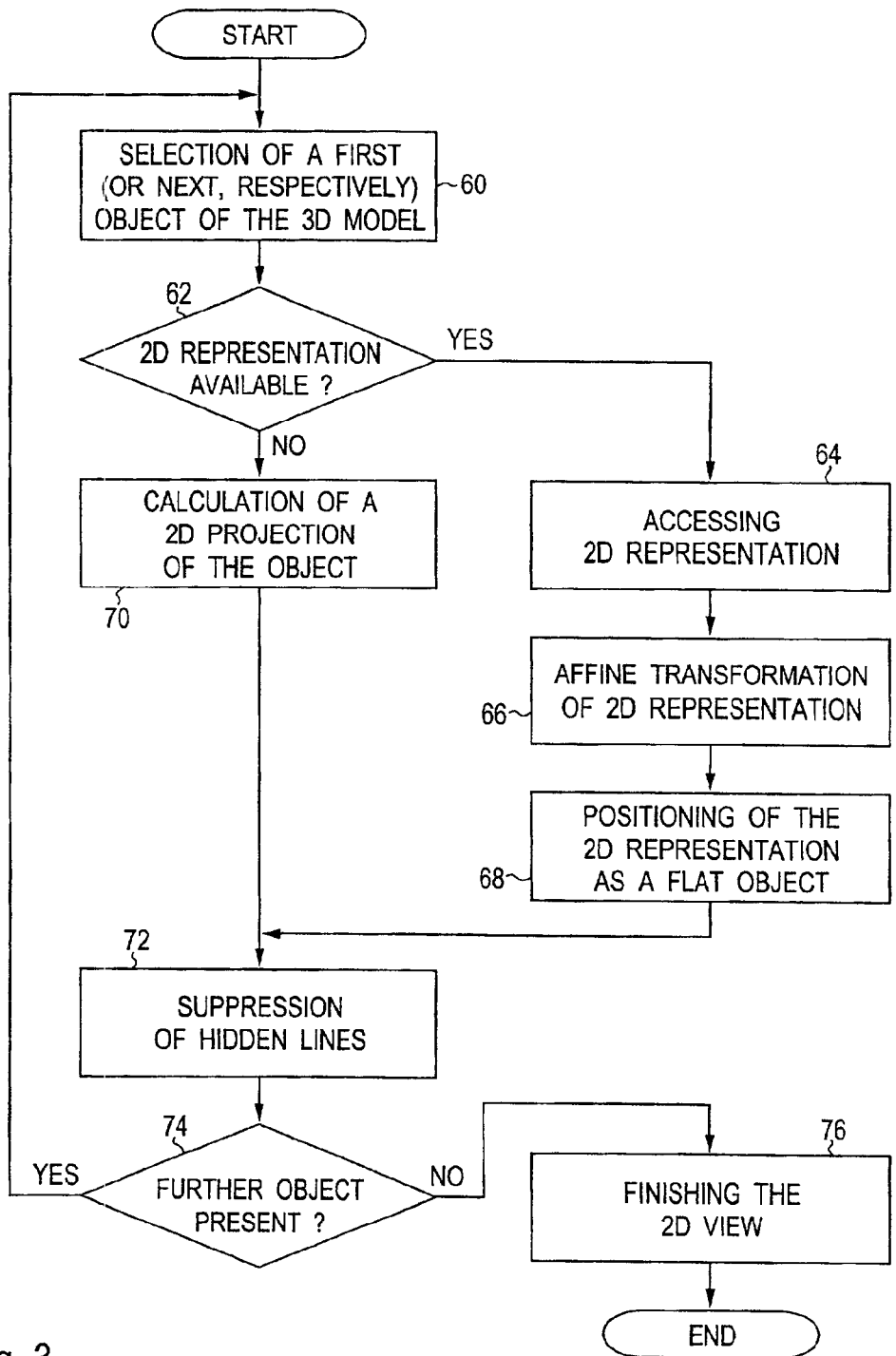

Further features, advantages and objects of the invention are apparent from the following detailed description of sample embodiments. Reference is made to the schematic drawings. The figures represent:

FIG. 1a and FIG. 1b a standard-conforming 2D view of a screw connection and, respectively, a 2D view of the screw connection calculated according to the prior art, FIG. 2 a schematic diagram for explaining the present invention by means of an example, FIG. 3 a flow diagram of a sample embodiment of the method of the present invention, and FIG. 4a to FIG. 4d different kinds of a 2D view of a screw connection.

The representations of FIG. 1a and FIG. 1b have already been described above.

For clarifying the invention once more and for illustrating the terminology used herein, FIG. 2 shows a 3D model 30 which comprises, in the present example, only a single object 32, namely a screw. For generating a 2D view 40 of a predetermined kind (in the present example a front view with the screw axis running within the drawing plane), a 2D projection 42 of the object 32 may be calculated by means of mathematical methods. These methods are known by themselves and are not the subject of the present invention.

However, the calculated 2D projection 42 does not conform to the result that would be required for a technical drawing with respect to several representational details. This has also been explained above with reference to FIG. 1a and FIG. 1b. In order to obtain an improved 2D view 40, a dictionary 50 is therefore associated with the object 32, the dictionary 50 containing a predetermined 2D representation 52 of the object 32 for each of a number of different kinds of 2D views (e.g., front view, top view, and so on). Since a suitable 2D representation 52 is present in the dictionary 50 for the sectional side view of the object 32 that has been chosen here, this 2D representation 52 will be used for the generated 2D view 40 instead of the 2D projection 42. The 2D representation 52 thus replaces the 2D projection 42 that would otherwise have to be calculated.

The method steps that have just been summarized with reference to FIG. 2 are shown in more detail in the flow diagram of FIG. 3. The method is automatically performed by a computer (e.g., a usual personal computer or a powerful workstation) under control of a CAD program. Execution of the method is initiated by a user directly or indirectly (via a macro mechanism). Pieces of information regarding the kind of the desired 2D view (e.g., direction of view, sectioned/non-sectioned view, scale, and so on) serve as parameters for executing the method.

An object of the 3D model is selected as the first step 60 of the method. For example, the selection may take place in order of decreasing distance of the object from the viewer such that the suppression of hidden lines is facilitated. When the selected object is determined, a check is made in test 62 whether or not a 2D representation of the object is available that is suitable for the 2D view to be created. In the course of this checking operation, in particular the direction of view of the 2D view, the classification of the view as a sectioned or a non-sectioned representation and user-defined options regarding the kind of the representation are evaluated. For the sake of acceleration, an initial test may be made in alternative embodiments whether or not the object is a standard part because, as a rule, suitable 2D representations will normally only be available for such standard parts.

If a suitable 2D representation is available (branch "yes" in test 62), then this 2D representation is accessed in step 64. An affine transformation of the 2D representation takes place in step 66 in order to adapt this representation, within the plane of the 2D view, to the orientation and the dimension of the object.

Finally, in step 68, the 2D representation is generated as a flat object, and it is positioned in the 2D view to be created. In the present sample embodiment, lines, arcs, line sequences and regions are provided as elements of the flat object. The flat object may comprise further elements in alternative embodiments, and/or it may be fashioned as a two-dimensional drawing. It is intended in further variant embodiments to assemble the flat object from several 2D representations of individual elements of an assembly (e.g., a screw connection), wherein a suppression of lines that are hidden by elements of the assembly is already provided in this step.

The positioning of the flat object in step 68 concerns both the arrangement of the flat object in the direction of the plane of the 2D view and the arrangement of the flat object in a direction perpendicular thereto. The positioning in the second mentioned direction serves for making a correct suppression of hidden lines possible. This will further be explained below by means of the examples of FIG. 4a to FIG. 4d.

If no suitable 2D representation has been found in test 62 (branch "no"), then the CAD program calculates the usual 2D projection of the object in step 70 in a way that is known as such.

The calculations required for suppressing hidden lines are performed in step 72. In the schematic representation of FIG. 3, these calculations are performed for each individual object processed during one execution pass of the loop. It is also possible, as an alternative, to combine the calculations completely or in part such that they take place for several objects at the same time. Such combined calculations may be performed after several execution passes of the loop. However, they may also be combined into an initial calculation of the hiding situation between the elements of an assembly, as this has already been described above in connection with step 68.

If another object is present in the 3D model, then branch "yes" of test 74 is chosen, and program execution continues in step 60 by the selection of an object that has not yet been processed. When all objects have been processed (branch "no" of test 74), the 2D view is finished in step 76. In particular, this finishing includes steps of calculating and suppressing hidden lines that possibly still have to be performed. The finished 2D view, and in particular the 2D representations used therein, are stored such that a repetition of the calculation-intensive processing steps of FIG. 3 may be avoided at least in part when the model or the parameters of the view, respectively, are changed in a minor way.

Figure 4A:
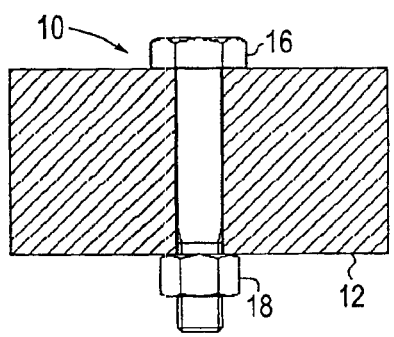
Figure 4B:
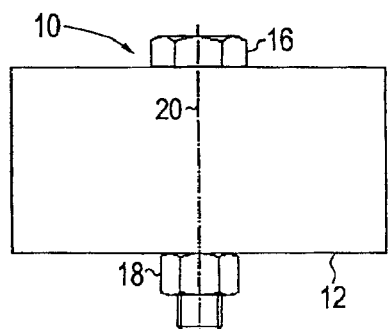
Figure 4C:
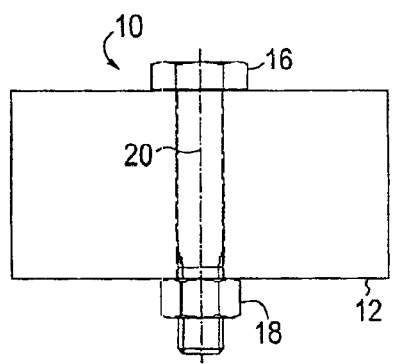
Figure 4D:
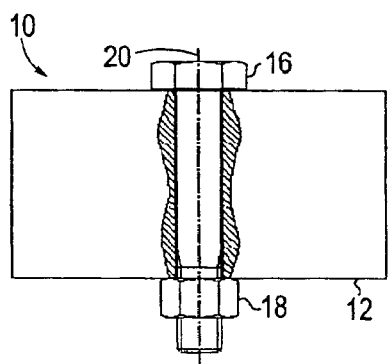

Several alternative 2D views 10 of a screw connection having a part 12, a screw 16 and a nut 18 are shown in FIG. 4a to FIG. 4d. It depends on the kind of the 2D view 10 that has been selected by the user which of these alternative views is displayed. The representation of FIG. 4a is the standard-conforming sectioned representation while the representations of FIG. 4b to FIG. 4d are three different versions of a front view that may be chosen by the user.

The 2D view 10 of FIG. 4a is the result of showing the part 12 through which the screw connection runs in a sectioned way. The 2D representation of the screw 16 is arranged immediately in front of the sectional face, and further parts of the screw connection (nut 18, shims, and so on) are in turn positioned immediately in front of the screw 16 (step 68 in FIG. 3). Hidden lines are not shown (step 72 in FIG. 3). A side view corresponding to the front view of FIG. 4a would be generated in the same way in principle; however, different 2D representations of the screw 16 and the nut 18, respectively (different direction of view towards the hexagonal forms) would be used.

In the already-mentioned variant embodiments, wherein an initial calculation of hidden lines within an assembly takes place, first a complete 2D view of the screw connection is generated from the 2D representation of the screw 16 and the 2D representation of the nut 18. In this process the lines of the screw 16 that are hidden by the nut 18 are suppressed. This complete 2D representation is then arranged in front of the sectioned part 12, and a second calculation of hidden elements is performed, this time, however, by the proper mechanism for projection from 3D into 2D.

The 2D view 10 according to FIG. 4b is obtained by selecting a non-sectioned front view of the part 12. Hidden lines of the portion of the screw 16 that runs within this part 12 are suppressed. The nut 18 and possibly further parts of the screw connection are arranged immediately in front of the 2D representation of the screw 16. The main axes of the screw 16, the nut 18 and the drilled hole (not shown in FIG. 4b) within the part 12 are arranged such that they coincide within the drawing plane. A corresponding axis line 20 is shown.

The 2D view 10 shown in FIG. 4c is similar to that of FIG. 4b wherein, however, lines of the drilled hole and the screw 16 that are hidden by the part 12 are shown. Lines of the screw 16 that are hidden by the nut 18 are not shown. This 2D view is only possible in embodiments of the CAD program of the present invention in which lines that are hidden by certain objects may selectively be shown or hidden. Again, the arrangement of the 2D representations of the screw 16 and the nut 18 is such that their main axes coincide with the middle line of the drilled hole in the part 12.

In the 2D view 10 according to FIG. 4d, the part 12 comprises a cutout such that the details of the screw connection may be shown better. Again, this kind of representation is only possible in embodiments of the invention that comprise a flexible mechanism for suppressing invisible lines. For example, the possibility may be provided to select a position of a 2D representation with respect to the suppression of invisible lines that differs from the "proper" position of the object. Then the 2D view 10 according to FIG. 4d is obtained by virtually arranging the predefined 2D representations of the screw 16, the nut 18 and the cutout in front of the part 12.

Again, variant embodiments are provided in connection with the representations of FIG. 4b to FIG. 4d in which hidden lines within an assembly are calculated in a preliminary step. This has already been described above using the representation of FIG. 4a as an example.

The screw connections that have just been explained as examples represent particularly complex cases of applying the method of the present invention. However, satisfactory results may in many cases already be achieved by simply substituting the calculated 2D projection of an object by the predefined 2D representation. This is even more so in connection with simple application cases. Giving just one further example, sprockets are usually displayed in a 3D model with just one tooth or two teeth. Correspondingly, the 2D projection would also comprise just one tooth or two teeth, while the usual practice in a "correct" 2D view would be to display all teeth. This correct 2D view can be obtained in a simple way by displaying a predefined 2D substitute representation (e.g., in the front view a representation of the front face of the sprocket). The 2D representation is positioned within the drawing plane centered with respect to the sprocket. In the direction perpendicular to the drawing plane, the 2D representation is positioned as a flat object in front of the sprocket and effectively replaces the sprocket.

It has thus been shown that considerable improvements may be achieved by the invention with respect to a further automation of the generation of exact 2D representations of 3D models. It is apparent that the application possibilities and alternative embodiments described above represent just some examples, and that a wide range of further applications of the teachings of the present invention exists. The details given above thus should not be construed as limitations of the scope of the invention, but rather as exemplifications of preferred embodiments thereof. Accordingly, the scope of the present invention should be determined not by the embodiments illustrated, but by the appended claims and their legal equivalents.

I claim:

1. A method for generating a 2D view of a 3D model, said 3D model comprising at least one object, said method comprising, for at least one object of said 3D model, the steps of:

testing whether or not a predefined 2D representation of said object is available for said 2D view, if said 2D representation is available, using this 2D representation in said 2D view, and if said 2D representation is not available, calculating a 2D projection of said object and using this 2D projection in said 2D view.

2. A method according to claim 1, wherein said predefined 2D representation of said object is different from any calculated 2D projection of said object.

3. The method of claim 1, wherein the kind of said 2D view to be generated is taken into account when testing whether or not said predefined 2D representation of said object is present.

4. The method of claim 1,
wherein lines of said predefined 2D representation of said object are suppressed in said 2D view in so far as said lines are hidden by said object or by other objects of said 3D model, wherein the classification of a line as hidden or visible takes place depending on at least one criterion taken of the group of criteria comprising the kind of said object and the kind of said 2D view and properties of other objects in amid 3D model.

5. The method according to claim 1,
wherein lines of said object or of other objects of said 3D model are suppressed in said 2D view in so far as said lines are hidden by said predefined 2D representation of said object, wherein the classification of a line as hidden or visible takes place depending on at least one criterion taken from the group of criteria comprising the kind of said object and the kind of said 2D view and properties of other objects in said 3D model.

6. The method according to claim 1,
wherein said predefined 2D representation of said objects is arranged as a flat object when generating said 2D view both in a direction of a plane of said 2D view and in a direction perpendicular therein.

7. The method of claim 6,
wherein the position of said flat object is determined depending on at least one criterion taken from the group of criteria comprising the kind of said object and the kind of said 2D view and properties of other objects in said 3D model.

8. The method of claim 1,
wherein said predefined 2D representation is subjected to an affine transformation when generating said 2D view.

9. The method of claim 1,
wherein said object represents one of a part end a feature of a part and a group of parts.

10. A computer program product for execution by a computer for generating a 2D view of a 3D model, said 3D model comprising at least one object, said computer program product comprising computer instructions that cause said computer to perform, for at least one object of said 3D model, the steps of:
testing whether or not a predefined 2D representation of said object is available for said 2D view,
if said 2D representation is available, using this 2D representation in said 2D view, and
if said 2D representation is not available, calculating a 2D projection of said object and using this 2D projection in said 2D view.

11. The computer program product of claim 10,
wherein the kind of said 2D view to be generated is taken into account when resting whether or not said predefined 2D representation of said object is present.

12. The computer program product of claim 10,
wherein lines of said predefined 2D representation of said object are suppressed in said 2D view in so far as said lines are hidden by said object or by other objects of said 3D model, wherein the classification of a line as hidden or visible takes place depending on at least one criterion taken of the group of criteria comprising the kind of said object and the kind of said 2D view and properties of other objects in said 3D model.

13. The computer program product of claim 10,
wherein lines of said object or of other objects of said 3D model are suppressed in said 2D view in so far as said lines are hidden by said predefined 2D representation of said object, wherein the classification of a line as hidden or visible takes place depending on at least one criterion taken from the group of criteria comprising the kind of said object and the kind of said 2D view and properties of other objects in said 3D model.

14. The computer program product of claim 10,
wherein said predefined 2D representation of said object is arranged as a flat object when generating said 2D view both in a direction of a plane of said 2D view and in a direction perpendicular thereto.

15. The computer program product of claim 10,
wherein said predefined 2D representation is subjected to an affine transformation when generating said 2D view.

16. An apparatus comprising at least one computer, said computer being programmed for generating a 2D view of a 3D model, said 3D model comprising at least one object, said computer being programmed for executing, for at least one object of the 3D model, the steps of:
testing whether or not a predefined 2D representation of said object is available for said 2D view,
if said 2D representation is available, using this 2D representation in said 2D view, and
if said 2D representation is not available, calculating a 2D projection of said object and using this 2D projection in said 2D view.

17. The apparatus of claim 16,
wherein the kind of said 2D view to be generated is taken into account when resting whether or not said predefined 2D representation of said object is present.

18. The apparatus of claim 16,
wherein lines of said predefined 2D representation of said object are suppressed in said 2D view in so far as said line are hidden by said object or by other objects of said 3D model, wherein the classification of a line as hidden or visible takes place depending on at least one criterion taken of the group of criteria comprising the kind of said object and the kind of said 2D view and properties of other objects in said 3D model.

19. The apparatus of claim 16,
wherein lines of said object or of other objects of said 3D model are suppressed in said 2D view in so far as said lines are hidden by said predefined 2D representation of said object, wherein the classification of a line as hidden or visible takes place depending on at least one criterion taken from the group of criteria comprising the kind of said object and the kind of said 2D view and properties of other objects in said 3D model.

20. The apparatus of claim 16,
wherein said predefined 2D representation of said object is arranged as a flat object when generating said 2D view both in a direction of a plane of said 2D view and in a direction perpendicular thereto.

21. The apparatus of claim 16,
wherein said predefined 2D representation is subjected to an affine transformation when generating said 2D view.

22. The computer program product of claim 10,
wherein said predefined 2D representation of said object is different from any calculated 2D projection of said object.

23. The apparatus of claim 16,
wherein said predefined 2D representation of said object is different from any calculated 2D projection of said object.

* * * * *

UNITED STATES PATENT AND TRADEMARK OFFICE
CERTIFICATE OF CORRECTION

PATENT NO. : 6,965,846 B2
APPLICATION NO. : 09/885591
DATED : November 15, 2005
INVENTOR(S) : Tobias Krimmer It is certified that error appears in the above-identified patent and that said Letters Patent is hereby corrected as shown below:

Column 9, line 20, "objects" should read --object--;

Column 9, line 23, "therein" should read --thereto--;

Column 10, line 28, "resting" should read --testing--.

Signed and Sealed this

Twenty-second Day of August, 2006

JON W. DUDAS
*Director of the United States Patent and Trademark Office*